United States Patent [19]

Kobata et al.

[11] Patent Number: 5,630,367
[45] Date of Patent: May 20, 1997

[54] ACTIVATED CARBON AND PRODUCTION THEREOF

[75] Inventors: Takeji Kobata; Yoshihiro Ikenaga, both of Sapporo, Japan

[73] Assignee: The Social Welfare Foundation Hokkaido Rehabily, Hokkaido, Japan

[21] Appl. No.: 385,464

[22] Filed: Feb. 8, 1995

Related U.S. Application Data

[62] Division of Ser. No. 197,964, Feb. 17, 1994, Pat. No. 5,438,029.

[30] Foreign Application Priority Data

Apr. 9, 1993 [JP] Japan ........................ 5-83486
May 17, 1993 [JP] Japan ........................ 5-114764

[51] Int. Cl.$^6$ ........................................ F23G 5/12
[52] U.S. Cl. ................................. 110/229; 110/234
[58] Field of Search ........................... 110/229, 234

[56] References Cited

U.S. PATENT DOCUMENTS 5,438,029  8/1995  Kobata et al. ..................... 502/430

FOREIGN PATENT DOCUMENTS

| 161644 | 12/1979 | Japan. |
| 58658 | 8/1981 | Japan. |
| 26914 | 12/1983 | Japan. |
| 79608 | 5/1989 | Japan. |

*Primary Examiner*—Steven Bos
*Assistant Examiner*—Thomas G. Dunn, Jr.
*Attorney, Agent, or Firm*—Darby & Darby

[57] ABSTRACT

A preparing process of activated carbon includes steps of: combusting scrap tires containing metal wire at 400° C. to 900° C. under the presence of oxygen, carbon dioxide and vapor; reheating the generated combustible gases up to 800° C. to 900° C. by adding a further fuel; causing the exhaust gas to heat-exchange with a water pipe boiler so that the temperature of the exhaust gas downs to 180° C. to 250° C.; and introducing the exhaust having a temperature of 180° C. to 250° C. into an electric dust collector so as to collect activated carbon. The particle size of the thus obtained distributed substantially in a range of 90 to 110 mesh and the CEC (cation exchange capacity) of the activated carbon falls within 30 to 40.

1 Claim, 6 Drawing Sheets

ACTIVATED CARBON AND PRODUCTION THEREOF

This is a division of application Ser. No. 08/197,964, filed Feb. 17, 1994, now U.S. Pat. No. 5,438,029.

BACKGROUND OF THE INVENTION (1) Field of the invention

The present invention relates to an activated carbon and a production process thereof, and more particularly, to an activated carbon, having a large cation exchange capacity (i.e., capacity of substituting bases, and to be referred to as CEC, hereinafter) and excellent in fertilizer retention and a production process thereof.

(2) Description of the Prior Art

Activated carbon is a porous carbonaceous substance having a large surface area and large adsorption ability and has a wide range of uses as an adsorbent for various purposes.

Specifically, activated carbon can be used for adsorbing gases and vapors, recovering solvents, purifying and deodorizing gases, disposal of waste water, and decolorizing and purifying solutions. Further, activated carbon can be used as supports for catalysts.

Activated carbons have been manufactured by treating wood or brown coal with an activating agent, e.g., zinc chloride, phosphoric acid and the like followed by dry distillation, alternatively, by activating charcoal with steam. For example, charcoal, coconut husk, and the like are sufficiently carbonized followed by a high temperature treatment by means of steam. Or the activated carbon is activated by soaking in zinc chloride and calcinated at a high temperature.

The thus produced activated carbon typically has specific surface area of 800 to 1200 $m^2/g$, pore volume of 0.2 to 2 $cm^3/g$ and pore size of 1 to 4 nm.

Activated carbon is mainly composed of carbon and includes small amounts of hydrogen, oxygen and inorganic components. With regard to the chemical structure, activated carbon is mainly composed of amorphous graphite and has functional groups such as hydroxy group, quinone group and the like on the surface.

Meanwhile, a typical activated carbon has a CEC or a capacity of substituting bases of about 1 to 7. CEC is represented by milligram equivalent (ME), which is a figure of expressing what milligram equivalent of bases a 100 g soil can retain, and CEC is used in the agriculture to indicate fertilizer retention ability in soil. That is, since, fertilizer components are generally composed of bases, the larger the CEC of soil, the more the soil can adsorb and retain fertilizer components. Therefore, the soil having a large CEC is capable of supplying fertilizers to crops continuously.

Accordingly, by utilizing the adsorbability of activated carbons, some activated carbons have been tried to be used as a fertilizer retaining agent to be compounded in a soil together with fertilizers. Nevertheless, the conventional activated carbons do not have a very high CEC (capacity of substituting bases), any particular result to be referred to has not been found.

Further, particle size of the activated carbons produced in conventional production process varies largely. For example, to prepare activated carbon graded in a particle size of 100 mesh, a considerable number of classifying steps would be needed so that the preparation was too complicated.

Meanwhile, in recent years, scrap tires as one of the industrial waste have increased largely in the amount and will be increased further with the spread of automobiles.

With regard to disposal of these scrap tires, various methods were already proposed in which scrap tires are burned as a fuel for a boiler for burning scrap tires so that the generated heat or heat energy may be utilized effectively to supply hot water, which in turn is used for bath, cooking and kitchen work, heating room and the like as occasion demands. These proposals are disclosed for example in Japanese Utility Model Application Laid-Open Sho 54 No. 58,658, Japanese Utility Model Application Laid-Open Sho 54 No. 161,644, Japanese Patent Application Laid-Open Sho 58 No. 26,914. Among them, specific features of these proposals are different with each other, nevertheless, any of these is oriented only to burn the scrap tires effectively and to utilize the generated heat efficiently, and no reference is found to formation of activated carbon.

On the other hand, the present inventors hereof noted that scrap tires as one of industrial wastes had increased largely in the amount with the recent spread of automobiles. That is, formerly, the scrap tires were burned only to heat water, but the present inventors previously found that activated carbon of good quality could be obtained when scrap tires were burned in a reformed and improved process of burning scrap tires. Namely, the present inventors proposed a technology in Japanese Patent Publication Hei 3 No. 79,608 which discloses a relatively simple configuration capable of obtaining an activated carbon of good quality from the cinder of scrap tires, and still providing an improved heat efficiency. This technology has been registered as Japanese Patent No. 1,709,953.

Now, the technology previously proposed by the present inventors will be described with reference to a perspective, partially cutaway view shown in FIG. 1.

Figure 1:
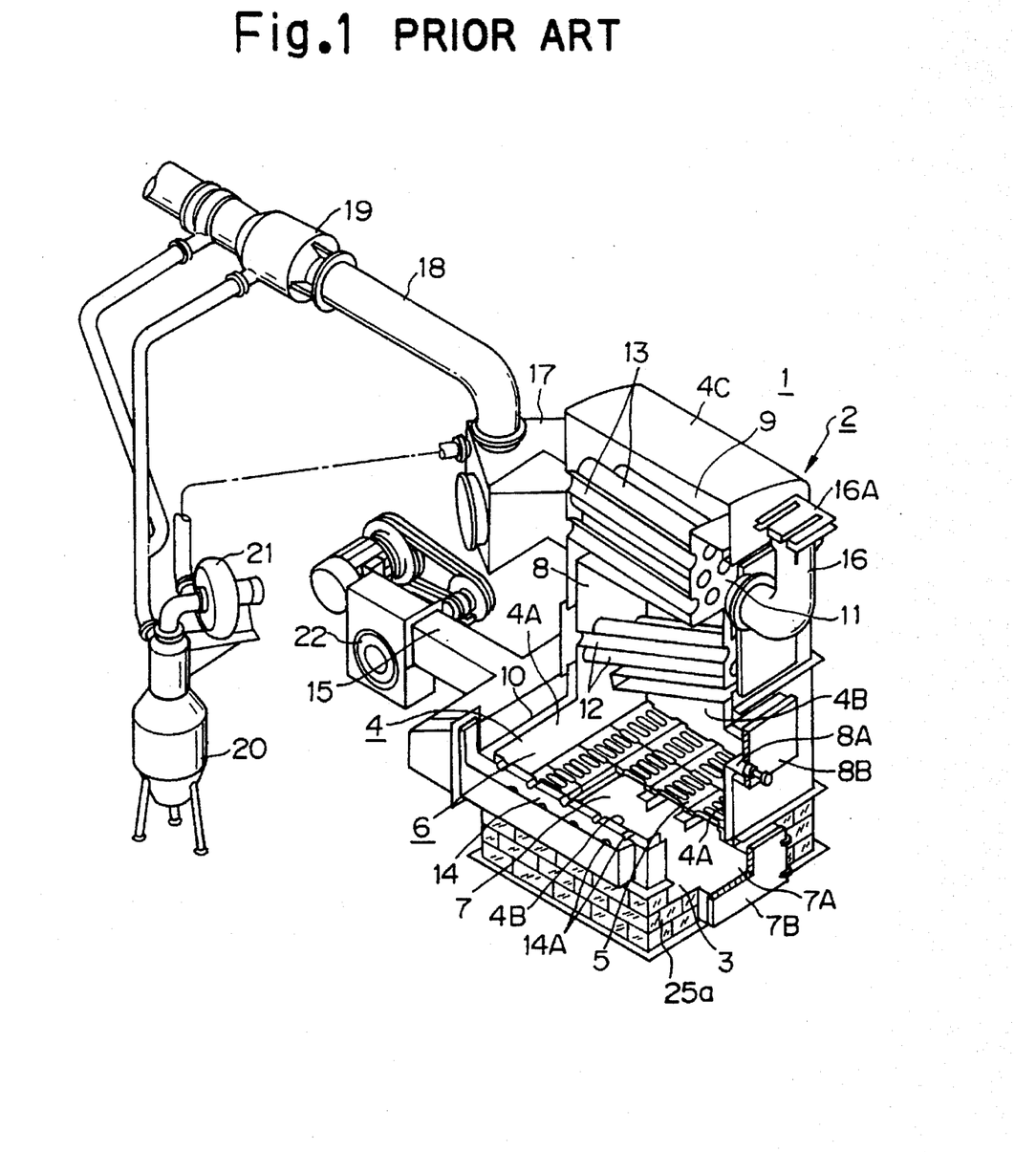
FIG. 1 is a perspective, partially cutaway view of a prior art boiler for burning scrap tires.

In FIG. 1, reference numeral 1 designates a boiler for burning scrap tires. The boiler is constructed by a boiler body 2, a furnace floor 3 and a boiler outer casing 4 which is composed of front and backside walls 4A, side walls 4B and top plate 4C so as to enclose a space over furnace floor 3.

Outer casing 4 is divided into two rooms, i.e., an upper room 6 and an ash collecting room 7 by a lattice partition 5 spread over and spaced a predetermined distance from furnace floor 3. It should be noted that wall 25a of the ash collecting room 7 is formed by laid bricks.

Further, upper room 6 is constructed by a combustion chamber 8 disposed at lower portion thereof and an upper water chamber 9. Formed on the periphery of the side wall of combustion chamber 8 is a lower water chamber 10 that communicates with upper water chamber 9.

Reference numeral 8A designates a tire charging port opened in the front of combustion chamber 8. A lid 8B that can be opened and closed is provided for tire charging port 8A.

Reference numeral 7A designates an ash extracting port opened in the front of combustion chamber 8. A lid 7B that can be opened and closed is provided for ash extracting port 7B.

An upper combustion chamber designated at 11 is formed in the front portion of the above-mentioned upper water chamber 9. The chamber 11 communicates with combustion chamber 8.

An appropriate number of water tubes designated at 12 are disposed obliquely inside combustion chamber 8. The front ends of the tubes 12 are connected with the front portion of lower water chamber 10. The rear ends of tubes 12, disposed lower than the front ends, are connected with the rear portion of lower water chamber 10. Accordingly, waste heat including flame and heat in combustion chamber 8 is exhausted while heating water tubes 12.

A proper number of furnace tubes designated at 13 are disposed inside upper water chamber 9. The front ends of furnace tubes 13 communicate with upper combustion chamber 11 while the other ends are opened on backside wall 4A.

Reference numeral 14 designates an air jacket, which is additionally attached onto side wall 4B of boiler outer casing 4 in a position corresponding to combustion chamber 8. Air jacket 14 is communicated with combustion chamber 8 through lower water chamber 10 by a pertinent number of blast tubes 14A.

Reference numeral 15 designates a duct that communicates with air jacket 14. A blower 22 is jointed to duct 15. Air supplied to combustion chamber 8 is drawn in by blower 22, and blown into combustion chamber 8 through duct 15 and air jacket 14.

An exhaust pipe designated at 16 is provided in the upper portion of front wall 4A in boiler outer casing 4 so as to communicate with upper combustion chamber 11. An explosion-proof lid 16A is provided to exhaust pipe 16.

Reference numeral 17 indicates an exhaust chamber, which is additionally provided in the upper portion of backside wall 4A in boiler outer casing 4 so as to enclose the backside openings of furnace tubes 13. Exhaust chamber 17 is jointed with an exhaust gas tube 18, which in turn is jointed to dry type dust collector 19. Dust collector 19 is joined with a dust banker 20. This dust banker also communicates with exhaust chamber 17 through a fan 21.

Figure 2:
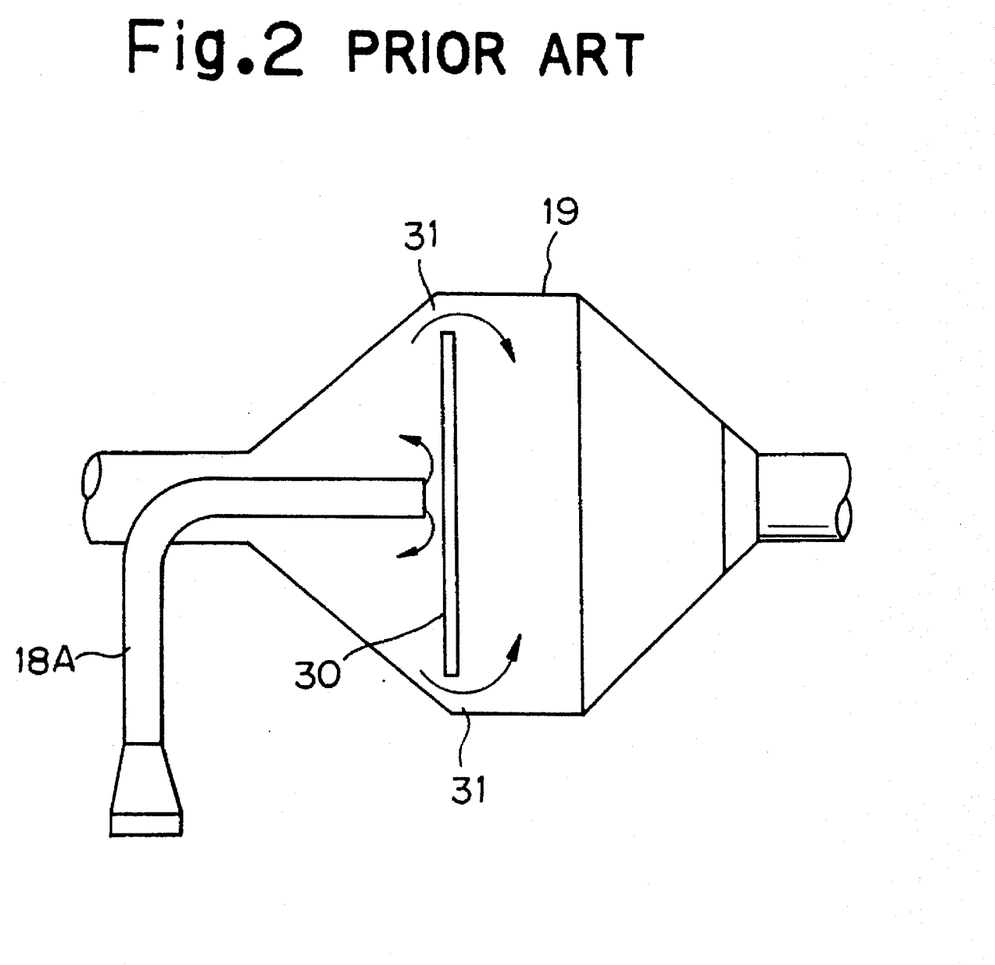
FIG. 2 is a schematically illustrative sectional view showing an inside structure of a prior art dry type dust collector.

In this case, the inside structure of dry type dust collector 19 is configurated as shown in a schematically illustrative sectional view in FIG. 2. Specifically, referring to FIG. 2, a baffle plate 30 is disposed inside dust collector 19 with a clearance 31 kept from the device wall. By this arrangement, suction air from a branch tube 18A flows as shown by arrows to generate a vortex flow to collect dust.

When scrap tires are burned in the thus constructed boiler, broken pieces of metal wires and activated carbon of good quality are accumulated as a cinder in ash collecting room 7. Therefore, it is possible to obtain activated carbons of different particle sizes by removing metal component by means of a magnet, etc., and classifying the residue using sieves.

The technology proposed previously by the present inventors is constructed as described heretofore.

As has been described, various kinds of boilers for burning scrap tires have been proposed, but there is yet room for further improvement, more or less for each of these proposals. With regard to the previously proposed technology by the present inventors, it is also desirable to make necessary improvements in order to further enhance the efficiency.

Boilers for burning scrap tires including the above-exemplified methods disclosed in the known articles are all constructed with blast tubes disposed under the lattice partition, or in upper portion of the combustion chamber, in order to enhance the efficiency of combustion. This structure suffers from the following drawbacks.

That is, in a case where the blast tubes are disposed under the lattice partition, the furnace inside wall is deteriorated by radiation heat generated by the combustion in the combustion chamber. To avoid this, an upright plate would be provided as a measure to protect the furnace inside wall from the radiation heat. But, this measure gives rise to new troubles, that is, the provision of the upright plate requires extra steps for the attachment and the installation becomes complicated.

On the other hand, when the blast tubes are disposed in upper portion of the combustion chamber, the blast tubes are directly exposed to flame of the combustion. Consequently, the tubes are deteriorated in a short period and must be replaced more frequently.

The technology proposed previously by the present inventors is to improve the above prior art method. Accordingly, the previously made proposal can provide a combustion system excellent in durability with a relatively simple configuration. The method further provides a good heat efficiency and a production of an activated carbon of good quality.

Nevertheless, the recent increase in the amount of scrap tires demands a further improvement of the processing efficiency in the disposal installation. Still more, as demand for the activated carbon of good quality obtained by the scrap tire disposal becomes larger, the production yield is desired to increase. For this reason, further improvement is desired also for the installation proposed previously by the present inventors.

SUMMARY OF THE INVENTION

It is therefore an object of the present invention to provide activated carbon that has a particle size-graded distribution and has a large value of CEC (cation exchange capacity) without executing a particular classifying process.

It is another object of the present invention to achieve improvement of a boiler for burning scrap tires for preparing the activated carbon, which can be improved in durability without the installation being complicated, that is, to effect further improvement of the boiler in its combustion efficiency and production yield of activated carbon.

The present invention has been achieved in order to attain the above objects.

A first gist of the present invention resides in activated carbon wherein particle size of activated carbon is distributed substantially in a range of 90 to 110 mesh and the CEC (cation exchange capacity) falls within 30 to 40.

A second gist of the present invention is characterized by a preparing process of activated carbon comprising steps of: combusting scrap tires containing metal wire at 400° C. to 900° C. under the presence of oxygen, carbon dioxide and vapor; reheating the generated combustible gases up to 800° C. to 900° C. by adding a further fuel; causing the exhaust gas to heat-exchange with a water pipe boiler so that the temperature of the exhaust has downs to 180° C. to 250° C.; and introducing the exhaust having a temperature of 180° C. to 250° C. into an electric dust collector so as to collect activated carbon.

In the present invention, scrap tires containing metal wire are burned at 400° C. to 900° C., and the generated combustible gas is reheated up to 800° C. to 900° C. by adding a further fuel such as heavy oil, etc. After this, the exhaust gas cooled down to 180° C. to 250° C. after heat-exchange with the water pipe boiler is introduced into the electric dust collector. By this process, it is possible to efficiently collect the activated carbon, in spite of a difference from the present general knowledge, although the mechanism of the phenomenon remains yet unclear. Besides, the size of the resulting activated carbon is distributed substantially in a range of 90 to 110 mesh with its distribution center at 100 mesh. Further, the obtained activated carbon of the invention is some or several tens times as large in CEC value as the activated carbons sold on the market, and the specific weight of the activated carbon in question is very low.

A third gist of the present invention is a means for realizing the aforementioned preparing process. That is, a preparing apparatus of activated carbon constructed by a boiler for burning scrap tires includes a boiler outer casing with a tire charging port, an upper water chamber and a lower combustion chamber as upper part inside the casing and an ash collecting room as lower part inside the casing, and a lattice partition disposed between the upper part and the lower part. The apparatus further includes a lower water chamber communicating with the upper water chamber, an upper combustion chamber communicating with the upper combustion chamber, an appropriate number of inclined water pipes, disposed inside the lower combustion chamber and connected to the lower water chamber, an appropriate number of furnace tubes, disposed inside the upper water chamber and connected to the upper combustion chamber, an air jacket disposed on a side wall of the outer casing; an appropriate number of blast tubes for communicating the air jacket with the lower combustion chamber through the lower water chamber; and a blower connected to the air jacket by a duct. The upper water chamber, the lower combustion chamber, the ash collecting room, the lower water chamber and the upper combustion chamber are disposed inside the boiler outer casing. In the apparatus with the above arrangement, the walls of the ash collecting room is constructed by a castable structure, a dry type dust collector connected to an exhaust gas tube disposed in the rear portion of the furnace tubes is of inertial separation type, the blower is connected through a valve means with a tubular body for supplying water spray, and an electric dust collector is provided between the exhaust gas tube and a chimney.

The preparing means of the activated carbon of the invention is thus constructed. According to the present invention, since air is blasted from blast tubes after passing through the duct and the air jacket, flames of combustion are pushed together toward the center of the combustion chamber. Accordingly, the side walls are exposed to no direct flame and therefore protected. Further, since the blast tubes are disposed in the lower water chamber formed in the periphery of the side walls of the combustion chamber, these tubes serve to reinforce the structure of the walls. Accordingly, it is possible to prevent the deformation of the combustion chamber side walls due to radiation heat.

In the present invention, the wall of the ash collecting room disposed under the lattice partition is constructed by a porous castable structure in place of the conventional bricked wall. Therefore, the wall itself can retain moisture, so that it is possible to obtain the equivalent effect to the vapor activation when the activated carbon is produced. In addition, the dry type dust collector of inertial separation type is adopted, it becomes possible to control the burning rate in the combustion room. Therefore, by controlling the burning rate together with water blowing (to be described next), it is possible to achieve an optimal condition of $CO$—$CO_2$ balance for oxidizing the steel wire, etc., contained in scrap tires. Moreover, since the apparatus of the invention includes a water supplying means for blasting water spray, it is possible to control the humidity in the combustion chamber to be kept in an optimal condition depending upon different moisture contents kept in the scrap tires charged into the combustion chamber.

Finally, in the present invention, the electric dust collector is provided between the exhaust gas tube and a chimney, and can efficiently collect the activated carbon having a size-graded distribution although the mechanism of the collection has not yet been cleared.

DESCRIPTION OF THE PREFERRED EMBODIMENTS

The present invention will hereinafter be described in detail with reference to embodiments.

First, description will be made on means for obtaining an activated carbon of the present invention.

Initially, as a starting material scrapped tires for automobiles are used, which tend to increase as industrial wastes in recent years. Such scrap tires generally contain metal wire such as steel wire, etc. By properly controlling the combustion atmosphere, the metal component can be oxidized and dispersed as the rubber component of scrap tires burns. These tires are burned in a furnace at 400° C. to 900° C., preferably, 700° C. to 800° C. under the presence of oxygen, carbon dioxide and vapor.

In this case, the air for combustion preferably contains high-level humidity, for example, at least 60% of relative humidity, and it is effective that water is added to the combustion atmosphere by a proper means, as required.

In the above combustion, combustible gases are generated from the decomposition and other reactions of rubber of scrap tires. In the present invention, these combustible gases are added with other fuel, and heated again to 800° C. to 900° C. to be introduced to a water tube boiler provided as a heat exchanger. Here, various kinds of fuels can be added such as heavy oil, light oil and natural gas and the like. Among these fuels heavy oil is most favorable to be added in view of workablity and handling.

Then, the exhaust gas having passed through the water tube boiler is reduced in temperature due to the heat exchange action to 180° C. to 250° C. and is introduced into an electric dust collector. In the electric dust collector, dust contained in the exhaust gas is charged from a corona discharge electrode, and the thus charged dust is attracted by electric force, i.e., Coulomb force exerted between the dust and a dust-collecting electrode. Finally, the charged dust is trapped by the dust-collecting electrode, so as to collect the effective content. This is the dust-collecting mechanism of the electric dust collector.

These steps can be achieved by reforming the installation of the boiler for burning scrap tire having the basic structure previously shown in FIG. 1.

The basic structure of the improved boiler for burning scrap tires is approximately the same with that of the previously proposed installation shown in FIG. 1. Therefore, the same parts are to be referred to FIG. 1 and repeated description will be omitted.

The present invention is effected by reforming the installation of FIG. 1. Hereinafter, the improvements made will be descried.

Figure 3A:
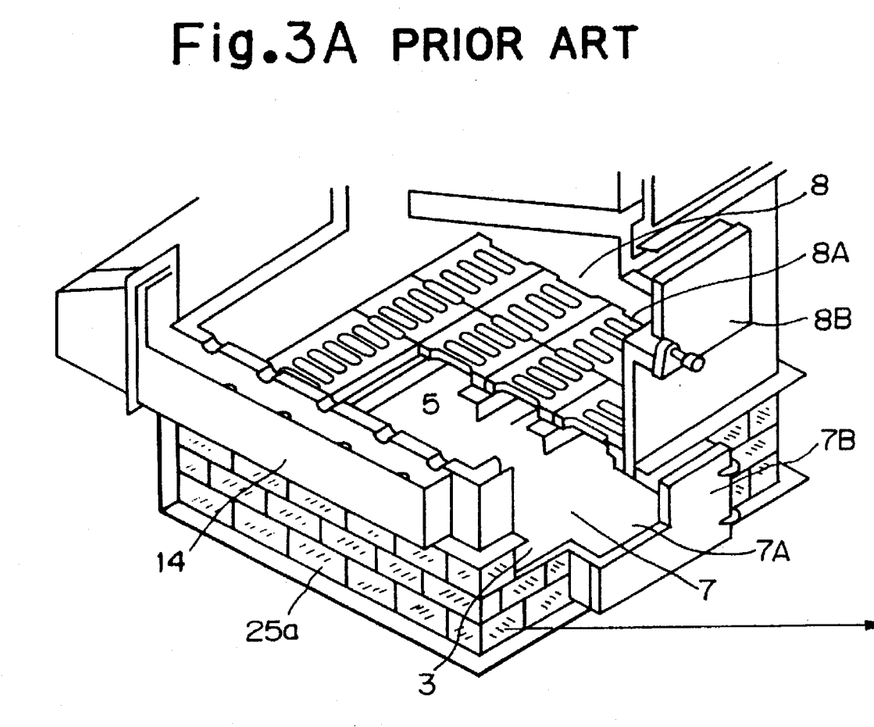
FIG. 3A is a perspective, partially cutaway view showing main component's in the vicinity of a lattice partition in a prior art boiler for burning scrap tires.
Figure 3B:
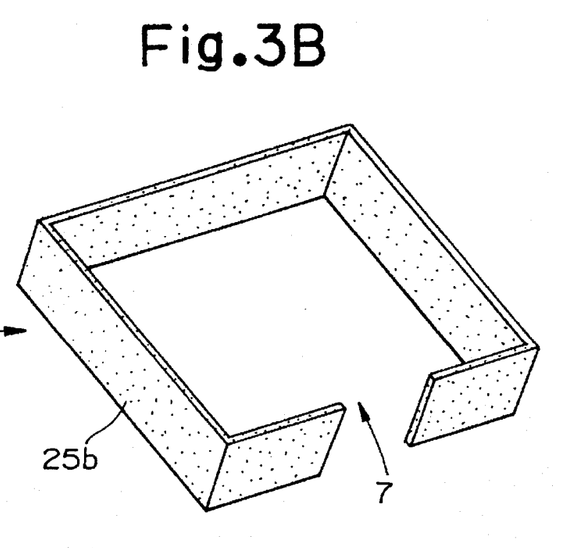
FIG. 3B is a perspective view showing a wall structure of an ash collecting room shown in FIG. 3A, for use in an activated carbon preparing means according to the present invention.

FIGS. 3A, 3B are perspective, partially cutaway views showing elemental components in the vicinity of a lattice partition in a boiler for burning scrap tires according to the present invention. In FIG. 3A, there are provided a furnace floor 3, a lattice partition 5. A combustion chamber 8 and an ash collecting room 7 is formed with lattice partition 5 therebetween. Each chamber has an opening and its lid. That is, combustion chamber 8 has a tire charging port 8A with a lid 8B and ash collecting room 7 has an ash extracting port 7A with a lid 7B. Reference numeral 14 designates an air jacket. The structure described heretofore is the same with the prior art installation. In the prior art, the wall 25a of ash collecting room 7 is constructed with laid bricks as shown in FIG. 3A, whereas wall 25b in the present invention is, as shown in FIG. 3B, formed with castable cement so as to create a castable structure.

Because castable material is porous, wall 25b formed by the castable structure as shown in FIG. 3B enjoys a structural merit that the occurrence of cracks due to thermal expansion is reduced as compared to the prior art bricked wall 25a. Further, another merit of the castable structure can be obtained as follows. That is, moisture is added in an appropriate amount when scrap tires are burned. The thus added moisture spreads out into the porous material of wall 25b having porous castable structure and is trapped inside pores. On the other hand, activated carbon containing metal pieces, which is produced as the scrap tires are burned as mentioned above, is accumulated under lattice partition 5 or in ash collecting room 7. In this case, proper amount of moisture is continuously released from the inside of the pores in the porous material of wall 25b having castable structure since the pores have moisture trapped. As a result, it is possible to obtain activated carbon of good quality in a large amount in a simple manner without any positive vapor activation. This advantage cannot be made in the bricked wall structure shown in FIG. 3A.

Next, one of main improvements of the boiler for burning scrap tires in accordance with the present invention, resides in the adoption of a dry type inertial dust-collector as a dry type dust collector.

Figure 4A:
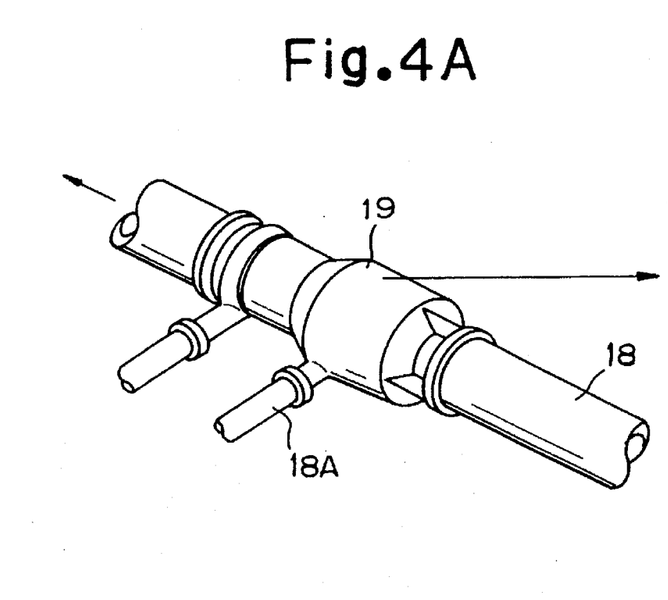
FIG. 4A is a perspective view showing elemental components in the vicinity of a dry type dust collector in a boiler for burning scrap tires for use in an activated carbon preparing means according to the present invention.

FIG. 4A is a perspective view showing elemental components in the vicinity of a dry type dust collector 19 in the installation previously shown in FIG. 1. Here, reference numeral 18 denotes an exhaust gas tube. Designated by 18A is a branch tube for communicating dust collector 19 with an unillustrated dust banker 20 (see FIG. 1).

Figure 4B:
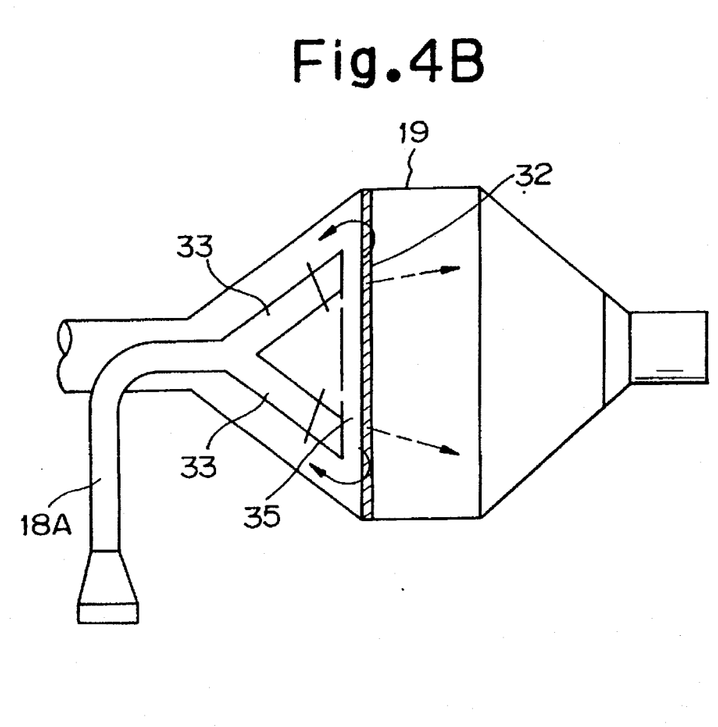
FIG. 4B is a schematically illustrative view showing an inside structure of a dry type dust collector in FIG. 4A.

FIG. 4B is a schematically illustrative sectional view showing an inside structure of dry type inertial dust collector 19 for use in the present invention. In FIG. 4B, differing from the prior art dry type dust collector 19 shown in FIG. 2, a plurality of branch pipes 33 is formed at the front end of branch tube 18A while a perforated plate 32 is provided so that the periphery of perforated plate 32 comes in contact with the inner face of dust collector 19 while a clearance 35 is taken between the tips of branch pipes 33 and perforated plate 32.

More specifically, holes of some or several millimeters in diameter are distributed in a desired pattern on perforated plate 32 while a proper clearance 35 is taken between the tips of branch pipes 33 and perforated plate 32 so as to generate a vortex flow inside dust collector 19 to thereby collect dust. The system in the present invention, not only achieves the effect of the dust collector itself, but also enables the adjustment of burning rate of scrap tires in combustion chamber 8 by properly controlling the distance of clearance 35. As a result, it becomes possible to control a balance of $CO-CO_2$ in the burning atmosphere by the combined effect of the adjustment of burning rate and water blowing for moisture adjustment (which will be described later).

The balance of $CO-CO_2$ is controlled in association with humidity in order to provide an optimal condition for promoting catalytic reactions of oxidizing metal wire, in particular, steel wire contained in scrap tires. A preferable relative humidity is 60% or more. That is, the balance of $CO-CO_2$ is controlled by adjusting clearance 35 while taking humidity into consideration.

In this case, in order to accelerate the oxidation of steel wire, etc., contained in scrap tires, it is effective that scrap tires are in advance chopped into pieces in arbitrary number before charging them into combustion chamber 8 of the boiler for combustion. This operation further improves the efficiency of the catalytic function stated above.

Figure 5A:
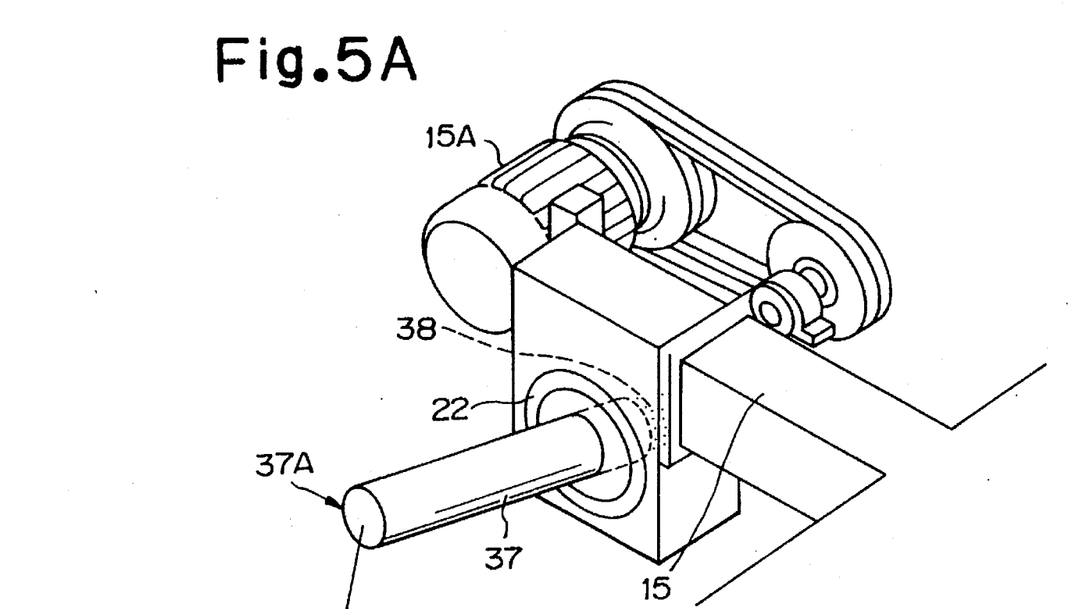
FIG. 5A is perspective view showing elemental components in the vicinity of a blower in a boiler for burning scrap tires for use in an activated carbon preparing means according to the present invention.
Figure 5B:
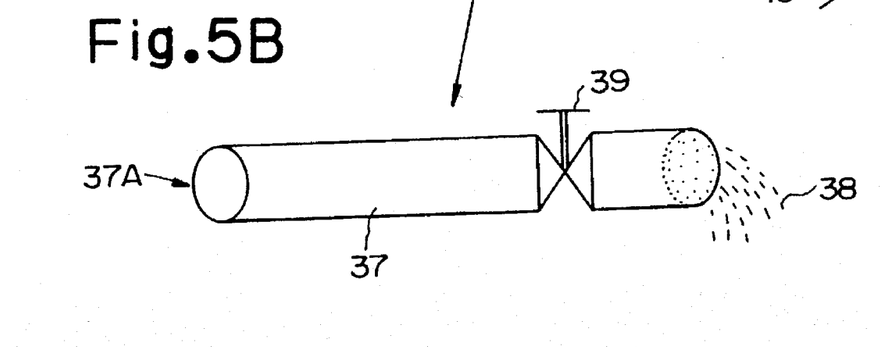
FIG. 5B is a schematically perspective view showing a tubular body in FIG. 5A.

FIGS. 5A and 5B are perspective views of elemental components for illustrating a water supplying means, which is another main improvement in the boiler for burning scrap tires according to the invention.

FIG. 5A shows a vicinity of a blower 22. In the figure, blower 22 is jointed to a duct 15 while blower 22 itself is energized by blowing motor 15A to send air to duct 15. In the invention, differing from the prior art installation shown in FIG. 1, blower 22 is provided with a tubular body 37 for supplying water spray 38 together with air through duct 15 into combustion chamber 8. Water spray 38 with air is introduced from one end 37A of tubular body 37. FIG. 5B is a schematic perspective view of tubular body 37, an element designated at 39 is a valve means for regulating quantity of water spray 38 and quantity of air introduced.

In this case, a preferable means for making water enter tubular body 37 in a spray may be constructed by, for example, providing a perforated plate on one end 37A. Metal pipes such as a common steel tube can be used for the material of tubular body 37.

When scrap tires are to be burned, in some cases, scrap tires may be wet, or may have ice or snow adhered thereon, especially, in the winter season. Even in such cases, that is, if the tires with water, ice, or snow attached thereon are burned, the arrangement described above allows valve means 39 for supplying water spray 38 to be freely manipulated to control the humidity inside combustion chamber 8 so that the oxidation condition for steel wire, etc., and the vapor adding condition for producing activated carbon of good quality may be optimized. This feature is markedly effective for improvement of the installation.

Next, in the preparing means of activated carbon in the present invention, it is possible to obtain activated carbon of size-graded distributions by providing an electric dust collector between the exhaust gas tube and a chimney.

Figure 6:
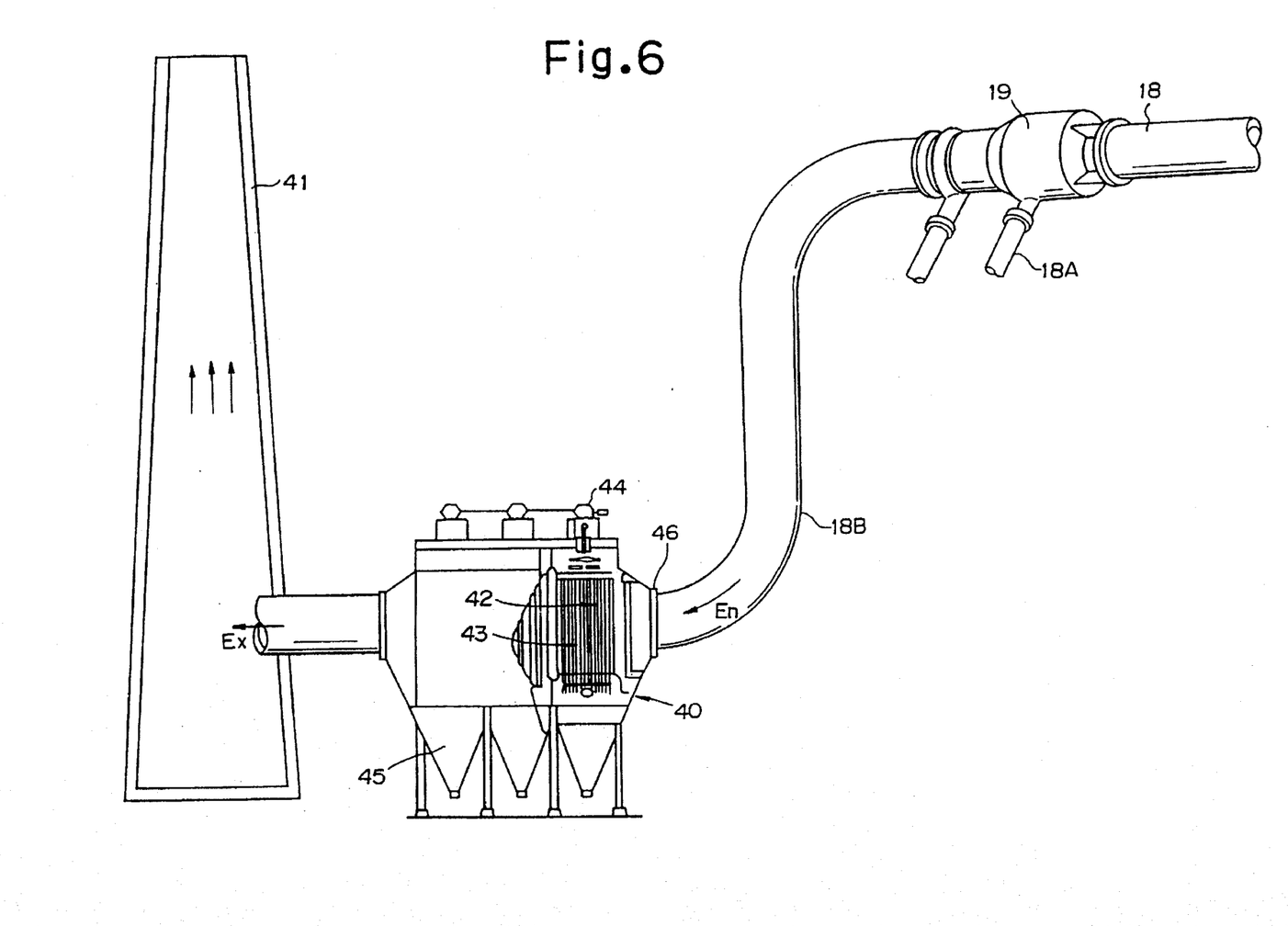
FIG. 6 is a schematic, partially cutaway view showing elemental components in the vicinity of an electric dust collector in a boiler for burning scrap tires for use in an activated carbon preparing means according to the present invention.

FIG. 6 is a schematic, partially cutaway view showing elemental components in the vicinity of an electric dust collector in a boiler for burning scrap tires for use in an activated carbon preparing means according to the present invention.

In FIG. 6, reference numeral 18B designates a fume conducting pipe for communicating exhaust gas tube 18 with a chimney 41 with an electric dust collector 40 inserted before chimney 41.

Electic dust collector 40 is composed of a discharge electrode 42 and a dust collecting electrode 43 as is shown in the partially cutout view of FIG. 6. Discharge electrode 42 is applied by a high voltage to generate corona current so as to electrify the powder and dust in the exhaust gas. On the other hand, dust collecting electrode 43 is to collect the thus charged powder and dust and accumulate them in layers. In this case, according to the present invention, the activated carbon contained in the exhaust gas is accumulated on dust collecting electrode 43 by the aforementioned operation. Designated at 44 is a vibrator for providing shocks to the dust collecting electrode. The vibrator 44 provides intermittent shocks to dust collecting electrode 43 to thereby drop the accumulated activated carbon into a hopper 45 for collection. In this way, an introduced gas En containing activated carbon sent out through fume conducting pipe 18B is cleaned and the thus cleaned gas Ex is discharged to open air through chimney 41.

Meanwhile, from a general knowledge, it is believed to be impossible that carbonaceous substances such as activated carbon is adsorbed by the dust collecting electrode based on the above-described mechanism. In other words, a common opinion is that the activated carbon produced by the combustion of scrap tires in the above-described preparing process cannot be collected by a dry type electric dust collector such as of Cottrell type.

The experiment result we obtained indicates a quite different view from that of the conventional one. The mechanism has not yet been cleared, but the activated carbon obtained by the means of the present invention can be collected efficiently by the electric dust collector. This should be assumed as a new, surprising finding without precedent.

Next, configurations of the thus obtained activated carbon in the invention will be detailed.

One of distinct features of the activated carbon of the invention from those in the prior art is that the activated carbon as collected by the electric dust collector is already graded in particle size without executing a particular classification step. Specifically, the collected activated carbon falls substantially in a range of from 90 mesh to 110 mesh with its distribution center at 100 mesh. This directly means that there is no need for executing complicated classification process, and therefore, the influence upon cost is of course great.

Another feature of the activated carbon of the invention that is distinct from those in the prior art resides in that CEC (capacity of substituting bases) of the activated carbon of the invention is some tens times as large as those delivered on the market.

Specifically, commercially sold activated carbon, for example coconut husk carbon exhibits a CEC value of about 1 to 7 milligram equivalent to 100 g soil as stated previously. In contrast to this, the activated carbon obtained by the present invention takes a CEC value of 30 to 40 milligram equivalent to 100 g soil. That is, the value actually reaches some tens times as large as that of the activated carbons on the market.

Why the activated carbon of the invention exhibits such a great CEC value has not yet been confirmed, but the activated carbon of the invention has an extremely small specific weight as compared to those used in general. This means that the size of pores inside the porous activated carbon particles is large and the cavity volume is particularly great. This can be believed as one of the causes.

Since the activated carbon of the invention has a large CEC value, it is possible to adsorb a great amount of fertilizer component. By taking advantage of the high fertilizer retention ability, the activated carbon can be applied to the betterment of soil and other possible uses in the agriculture field. The activated carbon of the invention naturally has all the common properties that an activated carbon should have, e.g., adsorbability and other properties, therefore it is possible to apply the activated carbon to the utilities invention to adsorb $NO_x$ and $SO_2$ in exhaust gas from in which known activated carbon has been used. For example, it is possible for the activated carbon of the engines at a high rate. Further, the activated carbon can be used as a filtering material for preventing air pollution and therefore the occurrence of acid rain due to air pollution. Since the activated carbon does not contain any chemically toxic substances, the activated carbon can be utilized for modification of water such as purifying water and decoloration of water in rivers. The activated carbon of the invention can lend itself widely to general utilities such as general deodorizing, adsorption, etc.

One example of the obtained activated carbon of the present invention will be followed by giving properties and compositions.

(a) Properties

Specific weight: 0.32

Particle size distribution: 90 to 110 mesh (99%), 100 mesh (50% or more)

Cation exchange capacity (CEC): 35.3 me/100 g (excellent fertilizer retention ability)

Decoloration (methylene blue): extremely quick (70% or more of dye is decolored instantaneously.)

| Adsorbability: | oil | adsorbable |
|---|---|---|
| | fungi | adsorbable |
| | ammonia odor | adsorbable |

Deodorizing rate: extremely high rate (b) Content

| | |
|---|---|
| Zn: | 10 ppm |
| Pb: | undetected |
| As: | undetected |
| Cd: | undetected |

Among the above data, with regard to the properties shown in (a), the activated carbon of the invention indicates distinct superiority in any of the properties to those on the market. Accordingly, the activated carbon of the present invention is apparently superior. As regards to contents shown in (b), the presence of Zn was observed, but the Zn content as much as above does not offer any problem when the activated carbon is used as a fertilizer retaining agent, etc. On the contrary, in western countries, a very small mount of Zn is taken positively as a medicine for the betterment of health, or is compounded to feed for cattle. Alternatively, fertilizer including Zn is sprinkled to crops. In other words, the effect of Zn tends to be recognized.

The above description of properties has been made on the activated carbon obtained through the electric dust collector in the process of the invention. But, as stated heretofore, a large amount of activated carbon of good quality is accumulated in the ash collecting chamber under the lattice partition in the boiler for burning scrap tires used as a preparing means of the present invention. With regard to the thus obtained activated carbon, after processing the product by removing metal piece with a magnet or other means, grading with sieves, the activated carbon of various particle sizes can be obtained. As to the fine powder component, the powder can be formed as required into pellets for convenience to be used.

The thus obtained activated carbon is more excellent in properties as compared with an activated carbon sold on the market. The comparison is shown in Table 1.

TABLE 1

| Activated carbon made by burning tire scrap (collected under the lattice partition) | | Activated Carbon sold on the market |
|---|---|---|
| Pencil hardness | B to 6B | H |
| Pore diameter | 100 to 400 Å | 23.5 to 32.7 Å |
| Specific surface area | 150 to 500 m$^2$/g | 900 to 1010 m$^2$/g |
| Cavity volume | 1.3 to 5.0 ml/g | 0.6 to 1.17 ml/g |
| CEC | 8 to 13 | 1 to 7 |
| Adsorption performace, etc. | Oil | adsorbable | non-adsorbable |
| | fungi | adsorbable | non-adsorbable |
| | Ammonia odor | adsorbable | hard to adsorb |
| | Deodorizing rate | extremely high | adsorbable but very slowly in long period |
| | Decoloration (methylene blue) | extremely high | normal |

As is apparent from the above data, although the activated carbon obtained through the electric dust collector has a markedly great CEC value and the particles as collected are generally graded in particle size without necessity of classifying process, the activated carbon obtained under the lattice partition is equivalent to the former with respect to the other properties.

As has been described heretofore, according to the present invention, it is possible to obtain activated carbon that has a particle size-graded distribution and has a large value of CEC (cation exchange capacity) without executing a particular classifying process by means of a dry type electric dust collector in a different collecting mechanism from that known conventionally. Further, it is possible to improve the boiler for burning scrap tires as a means realizing the present invention in its combustion efficiency and production yield of activated carbon. The effect of the improvement is extremely distinct without precedent.

What is claimed is:

1. An apparatus for burning scrap tires and for the production of activated carbon comprising:

a boiler outer casing with a tire charging port;

an upper water chamber;

a lower combustion chamber;

an ash collecting room;

a lattice partition disposed between an upper part composed of said upper water chamber and said lower combustion chamber and a lower part composed of said ash collecting room;

a lower water chamber communicating with said upper water chamber;

an upper combustion chamber communicating with said lower combustion chamber;

a number of inclined water pipes, disposed inside said lower combustion chamber and connected to said lower water chamber;

a number of furnace tubes, disposed inside said upper water chamber and connected to said upper combustion chamber;

said upper water chamber, said lower combustion chamber, said ash collecting room, said lower water chamber and said upper combustion chamber being disposed inside said boiler outer casing;

an air jacket disposed on a side wall of said outer casing;

a number of blast tubes for communicating said air jacket with said lower combustion chamber through said lower water chamber;

a blower connected to said air jacket by a duct, said blower connected through a valve means with a tubular body for supplying a water spray;

the walls of said ash collecting room being constructed of a porous castable structure;

the apparatus further comprising an inertial separation type dust collector connected to an exhaust gas tube disposed in the rear portion of said furnace tubes; and an electric dust collector between said exhaust gas tube and a chimney.

* * * * *